United States Patent
Oas et al.

[11] Patent Number: 5,853,775
[45] Date of Patent: Dec. 29, 1998

[54] NON-ROUND CONTAINER BLOW MOLDING APPARATUS

[75] Inventors: David C. Oas, Vandalia; Carl L. Knepper; David P. Meiring, both of Troy; Timothy L. Bright, Greenville, all of Ohio

[73] Assignee: Electra Form, Inc., Vandalia, Ohio

[21] Appl. No.: 986,256

[22] Filed: Dec. 5, 1997

[51] Int. Cl.[6] .................................................. B29C 49/68
[52] U.S. Cl. .......................... 425/145; 264/521; 425/171; 425/526; 425/534
[58] Field of Search .................................... 425/526, 529, 425/534, 171, 145; 264/521, 535

[56] References Cited

U.S. PATENT DOCUMENTS

| | | | |
|---|---|---|---|
| 3,775,524 | 11/1973 | Seefluth | 264/521 |
| 3,790,319 | 2/1974 | Hudson et al. | 425/526 |
| 3,950,459 | 4/1976 | Seefluth | 425/526 |
| 5,035,603 | 7/1991 | Unterlander et al. | 425/526 |
| 5,292,243 | 3/1994 | Gibbemeyer | 425/526 |
| 5,516,274 | 5/1996 | Maggert | 425/526 |
| 5,681,521 | 10/1997 | Emmer et al. | 425/526 |

FOREIGN PATENT DOCUMENTS 4-49023  2/1992  Japan ..................................... 264/521

*Primary Examiner*—Robert Davis
*Attorney, Agent, or Firm*—Locke Reynolds

[57] ABSTRACT

Method and apparatus for forming stretch blow molded containers having uniform sidewall thickness from physical symmetric parisons. Parisons are heated non-uniformly by rotating at a non-uniform rate in a heating station. A sensor determines the angular orientation of the parisons emerging from the heating station. Each parison is angularly reoriented at a repositioning station prior to introduction into a stretch blow molding station having non-round interior surfaces, so that the temperature profile of each parison corresponds with differential expansion required to form the desired non-round container.

12 Claims, 6 Drawing Sheets

NON-ROUND CONTAINER BLOW MOLDING APPARATUS

BACKGROUND OF THE INVENTION

1. Field of the Invention

The present invention pertains to methods and apparatus for re-heating and stretch-blow molding plastic parisons into containers having, in horizontal cross-section, at least in part a rotationally non-symmetric conformation, e.g., a generally oval, triangular or rectangular conformation. The present invention particularly pertains to methods and apparatus for the formation of such containers of substantially uniform wall thickness from physically symmetric parisons in which thermal variations are achieved which facilitate the rotationally non-symmetric conformation.

2. Description of the Prior Art

Earlier attempts to reheat and stretch blow mold plastic parisons into rotationally non-symmetric containers utilized parisons that were uniformly heated throughout. The resulting containers had sidewalls of non-uniform thickness, due to differential stretching of the parisons. Unfortunately, containers having sidewalls of varying thickness are generally unacceptable due to increased incidence of structural degradation and failure.

SUMMARY OF THE INVENTION

In order to aid in the understanding of the present invention, it can be stated in essentially summary form that it is directed to methods and apparatus for asymmetrically heating symmetric parisons and placing the parisons in a desired angular orientation in an asymmetric stretch blow mold, for molding into containers having a uniform sidewall thickness.

More specifically, the present invention includes a blow molding apparatus configured to receive a plurality of rotationally symmetric plastic parisons and output a plurality of non-round blow molded containers having a substantially uniform side wall thickness. The blow molding apparatus includes a transportation system extending through first and second heating stations and a blow molding station, capable of transporting parisons through the first and second heating stations and into the blow molding station in a step-wise fashion.

The transportation system has coupling elements including a parison conveyor attached to a support frame for coupling a plurality of parison holders together in an endless loop, and a stepping servomotor for driving the parison holders in a generally oval-shaped circuit. Each parison holder is capable of supporting one parison on one parison retainer. The parison conveyor moves in response to the stepping servomotor in the generally oval-shaped circuit which includes a first linear segment, a first curved segment, a second linear segment, and a second curved segment. The conveyor stepping servomotor is coupled to the conveyor and is adapted for transporting the plurality of parison holders in step-wise fashion, with each step advancing all parison holders by a spacing corresponding to a pair of parison holders.

A parison loader is disposed proximate to first linear segment, and includes a loader tray and a pair of pick arms. The loader tray defines a pair of generally parallel delivery tracks disposed adjacent to a parison hopper assembly, whereby parisons may be delivered from the parison hopper assembly along the delivery tracks to the pick arms. Each pick arm is adapted to engage a parison delivered along a delivery track, rotate towards parison holders, whereby parisons are delivered to and supported upon one of the parison holders. Preferably, the pick arm jaws may simultaneously engage and grab a pair of parisons, rotatably move the parisons to the parison holders, and release the parisons for support upon the parison holders in coordination with each step-wise movement of the parison holders. As the parison holders advance step-wise relative to the parison loader, each advancing parison holder receives one parison.

The parison conveyor includes a guide assembly mounted to the support frame and defining a drive chain guide. A drive chain is provided for sliding movement through the drive chain guide, and rides upon a drive chain guide insert. The first and second heating stations are attached to the support frame proximate to the first and second linear segments, respectively, and are capable of heating parisons supported upon parison holders prior to blow molding using a source of heat such as heating lamps. Each of a plurality of mandrel assemblies includes a rotatable member that is rotatably disposed through and carried by a mandrel pallet of each parison holder. Each rotatable member includes a parison engaging mandrel and a sprocket.

A first chain extends through the first heating station and engages a sprocket on each parison holder while the parison holders are in the first heating station. A first servomotor engages and drives the first chain as the parisons are step-wise transported through the first heating station by the conveyor, to effect a predetermined constant rate of rotation of the parisons relative to the heating lamps by rotation of the rotatable members, and consequently of the sprockets and the mandrels engaging the parisons. By rotating the parisons uniformly during movement through the first heating station, the parisons are heated in a rotationally symmetric fashion. For thicker parisons, or for other circumstances, it may be appropriate to rotate the parisons in the first heating station at a non-uniform rate as described below with respect to the second heating station.

A second chain extends through the second heating station and engages the sprocket on each parison holder while the parison holders move step-wise through the second heating station along with the conveyor. A second servomotor engages the second chain to drive the second chain at a prescribed cyclic non-uniform rate as the parisons are transported through the second heating station, to effect a predetermined non-uniform rotation of each parison. By rotating the rotatable members and the parisons mounted thereto at a non-uniform rate during movement through the second heating station, each parison is heated in a rotationally asymmetric fashion. The resulting controlled thermal variations as a function of angular orientation of each parison facilitates stretch blow molding of such heated parisons into rotationally non-symmetric containers having substantially uniform side wall thickness.

To determine the thermal variations as a function of angular orientation of each parison produced in the second heating station, at least one sensor is provided to identify an angular orientation of each parison at a selected position in the second heating station. The sensor includes at least one marker fixed to each rotatable member. In the case where a blow molded container having 180 degree symmetry is to be formed, a pair of markers may be fixed to each rotatable member by defining a pair of apertures through each sprocket and separated by 180 degrees with respect to the rotation axis of the rotatable member. Where blow molded containers having other than 180 degree symmetry are to be formed by the present invention, appropriate numbers and locations of the markers may be fixed to each rotatable member by defining appropriate apertures through each sprocket.

The sensor includes a pair of detectors is fixed at a selected position in the second heating station to detect the markers on each of a pair of parison holders during the non-uniform rate of rotation, for independently detecting the angular position of the markers so as to define an angular orientation relation between the markers of each of the pair of parison holders and a selected point in the cycle of the non-uniform rate of rotation. Where the markers include apertures, detectors may be adapted to detect aperture edges as the sprockets rotate. Each detector is coupled to an optic cable, and is mounted to a detector mount defining a detector hole disposed to permit light to enter the detector.

The blow molding station or stations may be disposed proximate to second linear segment, and an idle station or stations may be disposed after the second heating station, where the second chain disengages from the sprockets. At the idle station, the rotatable members and parisons engaged thereon may rotate freely, whereby information concerning the angular orientation of the parisons is lost. To regain such angular orientation information and reorient the parisons, a repositioning apparatus is disposed between the idle station and blow molding station, for independently angularly reorienting each parison immediately prior to introduction into the blow molding station. By such angular orientation, thermal variations in the parisons are employed to facilitate formation of non-round containers having a substantially uniform side wall thickness within blow molding station.

The repositioning apparatus includes a pair of spindles positioned to engage conical ends of the mandrels of the rotatable members. A separately controllable spindle servomotor is coupled to each spindle. A pickup is situated adjacent to each spindle for detecting the rotational position of the markers fixed to the rotatable member on each parison holder, and is coupled to an optic cable. Where the markers include apertures, the pickups may be adapted to detect the aperture edges as the sprocket rotates. Each spindle is movable into and out of engagement with a mandrel by sliding action of powered slide coupled to spindle and operated pneumatically. An electrical circuit is provided for independently operating each spindle servomotor for a time sufficient to reconstruct the angular orientation relation between each marker and the selected point in the cycle of the non-uniform rate of rotation for each rotatable member. The spindle servomotors are adapted to independently reposition each parison holder and hence each parison to a desired, optimum orientation immediately prior to introduction of the parisons into the blow molding station. As a result, thermal variations in the parisons caused by non-uniform heating in the second heating station are employed to facilitate formation of non-round containers having a substantially uniform side wall thickness within the blow molding station.

The blow molding station includes a pair of blow mold units having non-round interior surfaces and defining an axis that corresponds with a symmetry axis defined by parisons positioned in the blow mold units prior to blowing. Additionally, each non-round interior surface has rotational periodicity corresponding with the number and location of the markers fixed to the rotatable members. The blow molding station is adapted to simultaneously blow a pair of parisons to form non-round blow molded containers having a substantially uniform side wall thickness from rotationally symmetric parisons in coordination with each step-wise movement, where the repositioning apparatus has oriented those portions of each parison having relatively higher temperature to be blown into contact with regions of the interior surfaces disposed relatively closer to the axis of the blow mold unit, and has oriented those portions of each parison having relatively lower temperatures to be blown into contact with regions of the interior surfaces disposed relatively more distant from the axis of the blow mold unit. By orienting the parisons in this manner prior to blow molding, lower temperature portions of each parison are blown to relatively larger radial distances from the axis of the blow mold unit, while higher temperature portions of each parison are blown to relatively smaller radial distances from the axis of the blow mold unit, resulting in formation of non-round containers having a substantially uniform side wall thickness.

After the blow molding station has blown a pair of parisons into blow molded containers with each step-wise movement of parison holders, conveyor moves the blow molded containers from the blow molding station to a parison unloader disposed proximate to the second curved segment and capable of disgorging the blow molded containers. It is preferred that the unloader disgorge the blow molded containers in coordination with each step-wise movement of the parison holders.

The present invention further includes a programmable unit for coupling and coordinating movements of the stepping servomotor, the parison loaders, the blow molding station, the first and second servomotors, the spindle servomotors, and the parison unloader. The programmable unit includes an apparatus controller coupled to a protocol converter, which is in turn coupled to a servomotor controller. The apparatus controller may also receive a variety of information from other components of the apparatus of the present invention, and provide outputs to control such components. An operator interface is also coupled to the apparatus controller.

The programmable unit acts so that during each step-wise movement of parison conveyor, the parison holders step-wise advance around the parison conveyor. The servomotor controller is coupled through a first servo drive amplifier to the first servomotor for prescribing rotation of the parisons being transported through the first heating station, and to the second servomotor through a second servo drive amplifier for prescribing the non-uniform rate of rotation of the parisons as the parisons are transported through the second heating station. The programmable unit electronically "gears" the first and second servomotors to the stepping servomotor. The programmable unit is also coupled to each detector through the optic cables for correlating the angular orientation of each parison at a selected position in the second heating station with a cycle of the non-uniform rate of rotation, and is coupled to each pickup for independently detecting the rotational position of the markers fixed to the rotatable member on each parison holder. In addition, the servomotor controller is coupled to the spindle servomotors through third and fourth servo drive amplifiers for independently angularly reorienting each parison holder, so that each parison is disposed at a chosen angular orientation prior to introduction into the blow molding station.

The programmable unit also acts so that during each step-wise movement of the parison conveyor, a pair of parisons moves from the second heating station to the idle station, another pair of parisons moves from the idle station to the repositioning apparatus, yet another a pair of parisons moves from the repositioning apparatus to the blow molding station, and a pair of blow molded containers moves from the blow molding station to the parison unloader. Further, after each step-wise movement of parison conveyor, a pair of parisons is loaded onto the parison holders at the first linear segment, another pair of parisons is blow molded to form containers at the blow molding station, and a pair of blow molded containers is disgorged from the parison unloader.

Although the number of pick arms, parison delivery tracks, detectors, spindles, spindle servomotors, blow mold units, and unloader arms is selected to be two, and each step-wise movement of the conveyor advances parison holders by a spacing corresponding to two parison holders within the scope of the present invention, the number of pick arms, parison delivery tracks, detectors, spindles, spindle servomotors, blow mold units, and unloader arms may be chosen to be greater or less than two.

The method of the present invention for blow molding a non-round container having a substantially uniform sidewall thickness from a rotationally symmetric parison includes transporting the parison through the second heating station, and cyclically rotating the parison a prescribed non-uniform rate as the parison is transported through the second heating station to induce thermal variations in the parison. The step of cyclically rotating the parison may also include engaging the second chain with the sprocket on the rotatable member of the parison holder while the parison holder is in the second heating station, and coupling the second servomotor to drive the second chain at the prescribed non-uniform rate as the parison is transported through the second heating station.

The method further includes sensing an angular orientation of the parison at a selected position in the second heating station, and may also include detecting a rotational position of at least one marker fixed to the rotatable member of the parison holder during a cycle of the prescribed non-uniform rate of rotation and defining a relation between the rotational position of the at least one marker and the cycle of the non-uniform rate of rotation.

In addition, the method includes angularly reorienting the parison after heating and immediately prior to introduction into the blow molding station so that the thermal variations can be employed to facilitate formation within the blow molding station of a non-round container having a substantially uniform side wall thickness. The step of angularly reorienting the parison may also include positioning the spindle to engage the rotatable member and operating the spindle servomotor for a time sufficient to angularly reorient the parison to reconstruct the relation between a marker and a selected point in the cycle of the non-uniform rate of rotation.

The method of the present invention may further include coupling the programmable unit to the sensor for correlating the angular orientation of the parison at the selected position in the second heating station with a cycle of the non-uniform rate of rotation, coupling the programmable unit to the pickup for detecting the rotational position of the at least one marker, and coupling the programmable unit to the spindle servomotor for angularly reorienting parison holder, whereby the parison is disposed at a chosen angular orientation prior to introduction into the blow molding station.

DESCRIPTION OF THE PREFERRED EMBODIMENTS

The following portion of the specification, taken in conjunction with the drawings, sets forth the preferred embodiments of the present invention. The embodiments of the invention disclosed herein are the best mode contemplated for carrying out this invention in a commercial environment, although it should be recognized and understood that various modifications can be accomplished within the parameters of the present invention.

Turning now to the drawings for a detailed description of the present invention, reference is first made to FIGS. 1–4, generally depicting blow molding apparatus 100 configured to receive a plurality of rotationally symmetric plastic parisons and output a plurality of non-round blow molded containers having a substantially uniform side wall thickness. Blow molding apparatus 100 includes transportation system 101 extending through first and second heating stations 102 and 103, respectively, and blow molding station 104, for transporting parisons through first and second heating stations 102 and 103 and into blow molding station 104 in a step-wise fashion.

Figure 1:
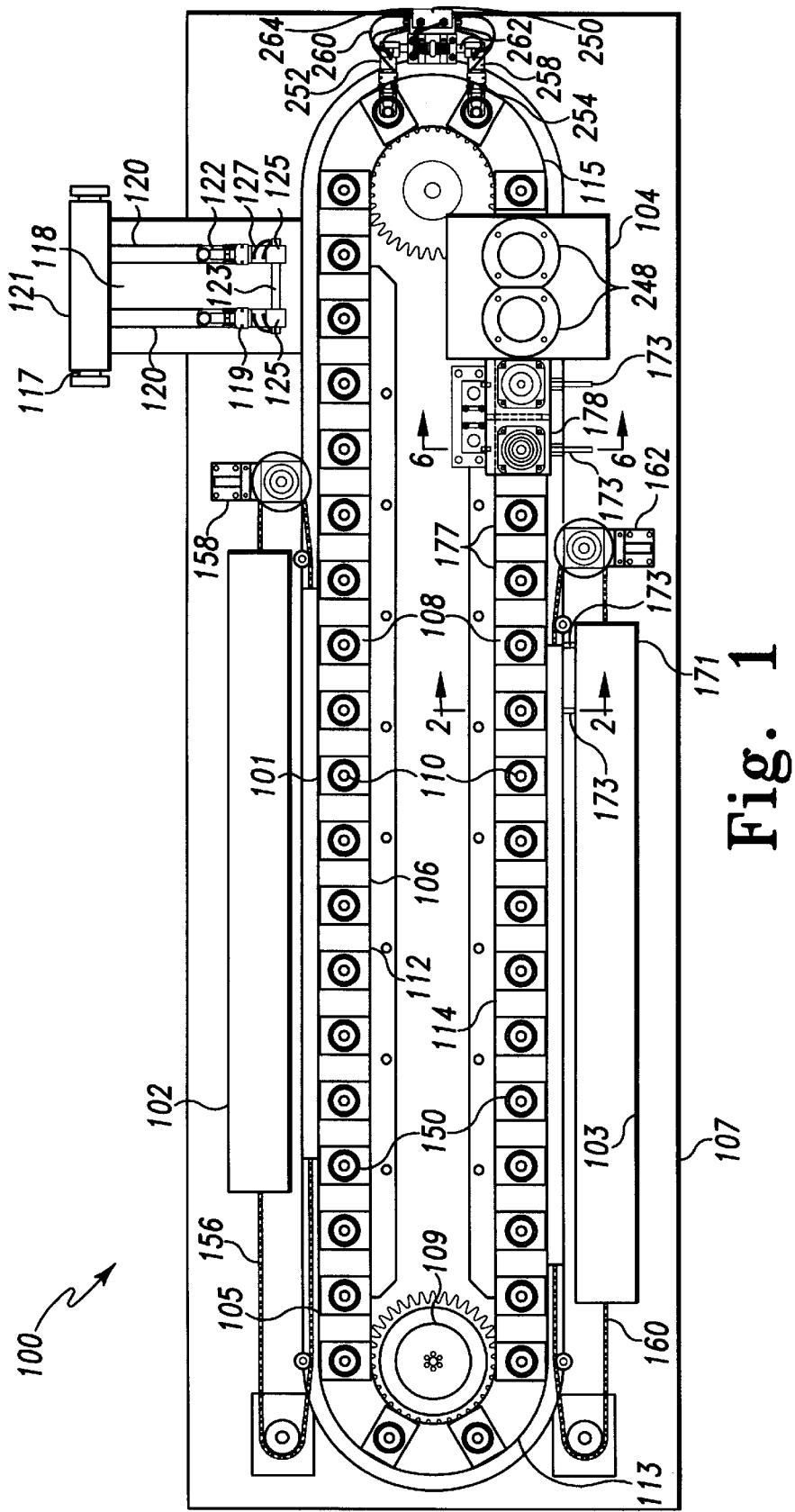
FIG. 1 is a plan view of a non-round container blow molding apparatus representing the present invention.

Transportation system 101 has coupling elements 105 including parison conveyor 106 attached to support frame 107 for coupling a plurality of parison holders 108 together in an endless loop, and stepping servomotor 109 for driving parison holders 108 in a generally oval-shaped circuit. Each parison holder 108 is capable of supporting one parison on one parison retainer 110. Parison conveyor 106 moves in response to stepping servomotor 109 in the generally oval-shaped circuit which includes first linear segment 112, first curved segment 113, second linear segment 114, and second curved segment 115. As depicted in FIG. 1, parison conveyor 106 moves in an anti-clockwise motion. Conveyor stepping servomotor 109 is coupled to conveyor 106 and is adapted for transporting the plurality of parison holders 108 in step-wise fashion, with each step advancing all parison holders 108 by a spacing corresponding to a pair of parison holders 108.

As shown in FIG. 1, parison loader 117 is disposed proximate to first linear segment 112. Parison loader 117 includes loader tray 118 and a pair of pick arms 119. Loader tray 118 defines a pair of generally parallel delivery tracks 120 disposed adjacent to parison hopper assembly 121, whereby parisons may be delivered from parison hopper assembly 121 along delivery tracks 120 to pick arms 119. Each pick arm 119 has a pair of opposing, movable pick arm jaws 122 and is mounted along one side of rotatable loader axle 123. Each pick arm 119 is adapted to engage or grab a parison delivered along a delivery track 120 by pinching movement of pick arm jaws 122 actuated by air pressure supplied to pick arm jaw pneumatic actuators 125 by air tubing 127. After pick arm jaws 122 pinch together to grip parisons, pick arms 119 rotate towards parison holders 108 due to rotation of loader axle 123 resulting from actuation of a pick arm rotation driver, not shown. In this way, pick arms 119 move parisons from loader tray 118 to parison holders 108. Thereafter, pick arm jaw pneumatic actuators 125 cause pick arm jaws 122 to separate, releasing parisons, whereby parisons are delivered to and supported upon one of parison holders 108. Preferably, pick arm jaws 122 may simultaneously engage and grab a pair of parisons, rotatably move the parisons to parison holders 108, and release the parisons for support upon parison holders 108 in coordination with each step-wise movement of parison holders 108. As parison holders 108 advance step-wise relative to parison loader 117, each advancing parison holder 108 receives one parison.

Figure 2:
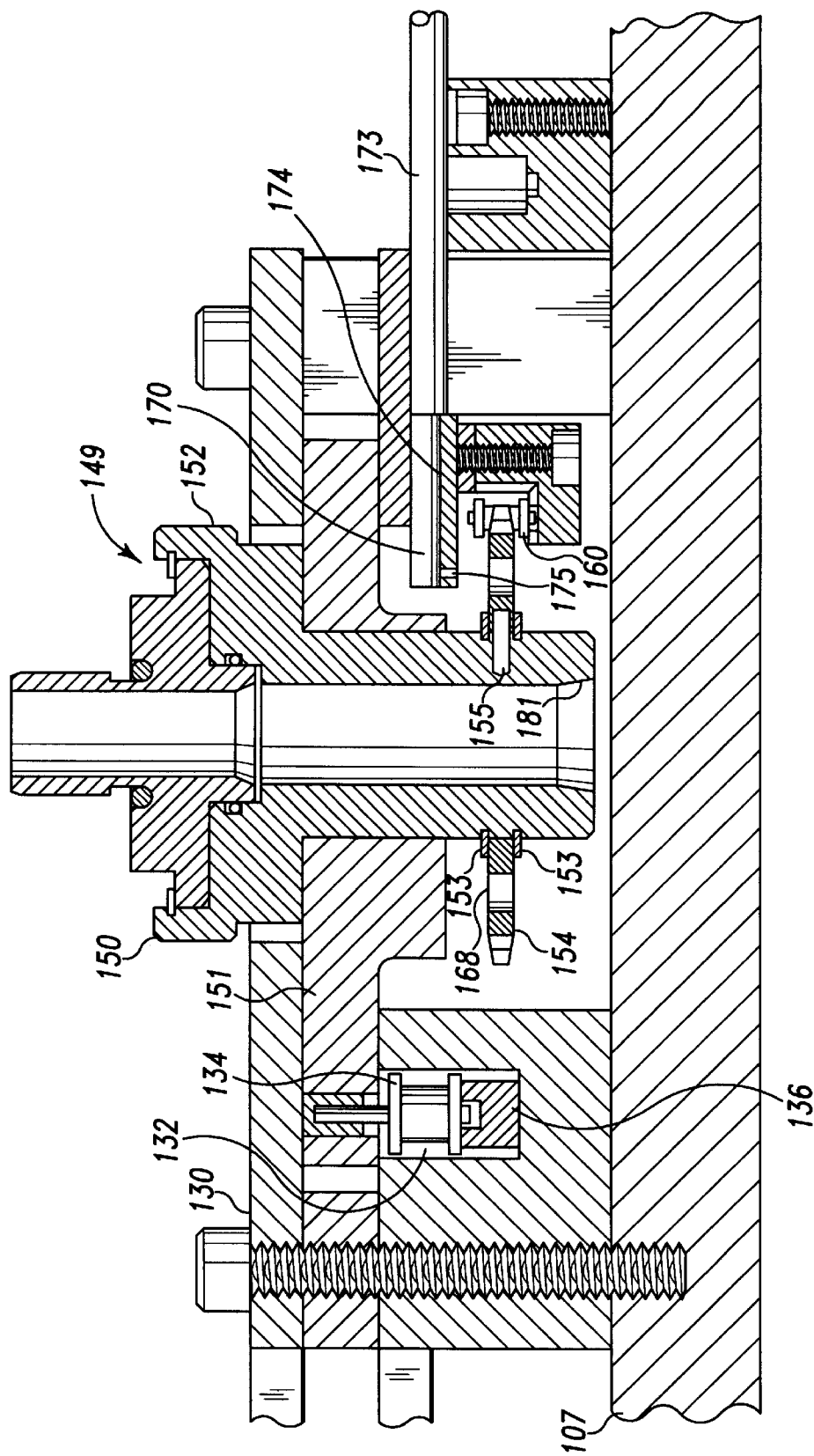
FIG. 2 is an enlarged detail partial section view taken along line 2—2 of FIG. 1.

Parison conveyor 106 includes guide assembly 130 mounted to support frame 107 and defining drive chain guide 132. Drive chain 134 is capable of sliding movement through drive chain guide 132, riding upon drive chain guide insert 136. First and second heating stations 102 and 103 are attached to support frame 107 proximate to first and second linear segments 112 and 114, respectively. First and second heating stations 102 and 103 are capable of heating parisons supported upon parison holders 108 prior to blow molding, using a source of heat, such as heating lamps, not shown. Mandrel assembly 149 includes rotatable member 150 rotatably disposed through and carried by mandrel pallet 151 of parison holder 108. Rotatable member 150 includes parison engaging mandrel 152 and sprocket 154, as shown in FIG. 2. Each sprocket 154 is mounted to a mandrel 152 using a pair of snap rings 153 and dowel 155. First chain 156 extends through first heating station 102 and engages sprocket 154 on each parison holder 108 while parison holders 108 are in first heating station 102. First servomotor 158 engages and drives first chain 156 as the parisons are step-wise transported through first heating station 116 by conveyor 106, to effect a constant predetermined rate of rotation of the parisons relative to the heating lamps by rotation of rotatable members 150, and hence of sprockets 150 and mandrels 152 engaging the parisons. By rotating the parisons during movement through first heating station 102, the parisons are heated in a rotationally symmetric fashion. Second chain 160 extends through second heating station 103 and engages sprocket 154 on each parison holder 108 while parison holders 108 move step-wise through second heating station 103 with conveyor 106. Second servomotor 162 engages second chain 160 to drive second chain 160 at a prescribed cyclic non-uniform rate as the parisons are transported through second heating station 103, to effect a predetermined non-uniform rotation of each parison. By rotating rotatable members 150 and hence the parisons at a non-uniform rate during movement through second heating station 103, each parison is heated in a rotationally asymmetric fashion. The resulting controlled thermal variations as a function of angular orientation of each parison facilitates stretch blow molding of such heated parisons into rotationally non-symmetric containers having substantially uniform side wall thickness, as will be described.

Figure 4:
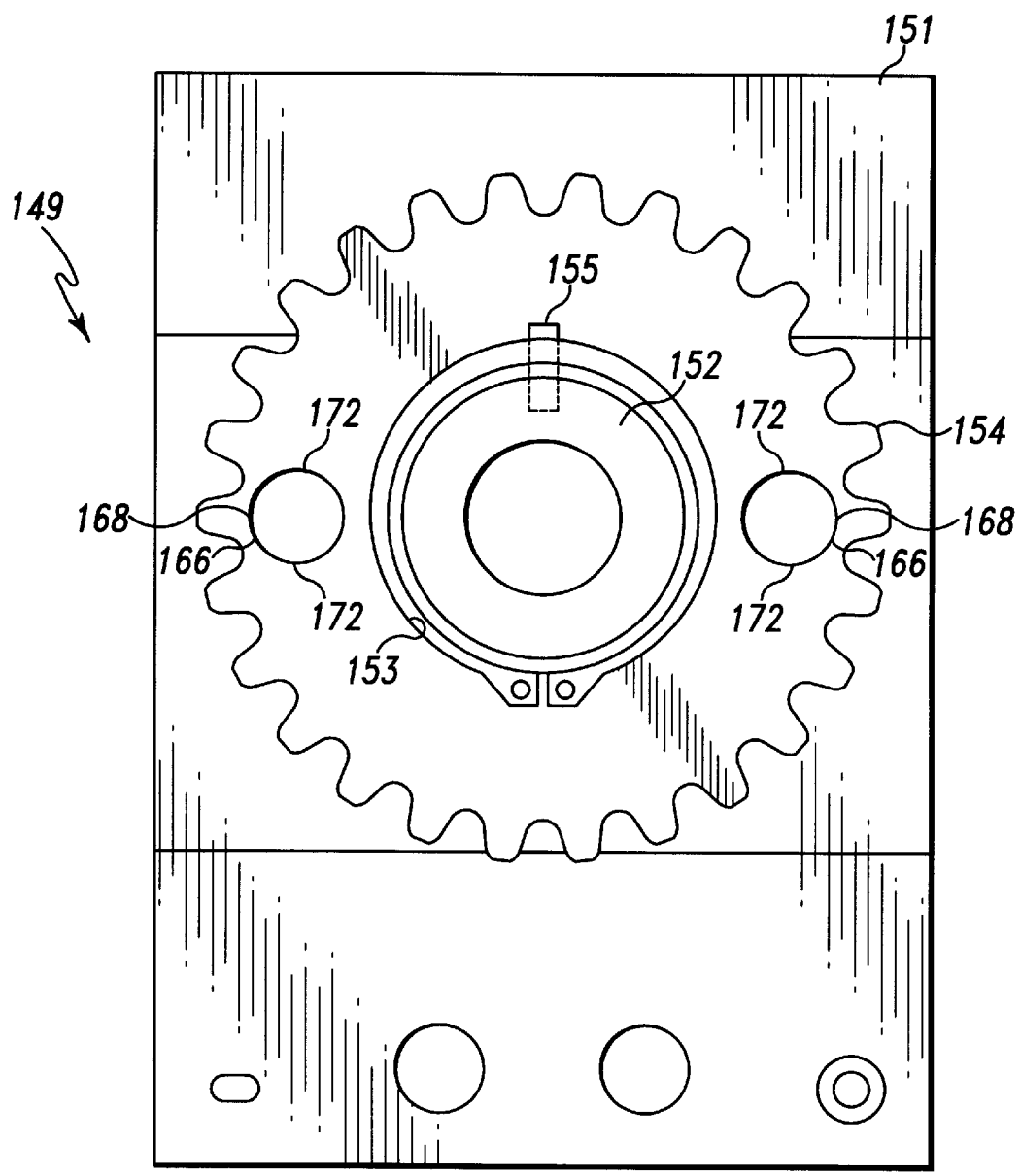
FIG. 4 is an enlarged detail bottom plan view of the mandrel assembly of a non-round container blow molding apparatus representing the present invention.
Figure 5:
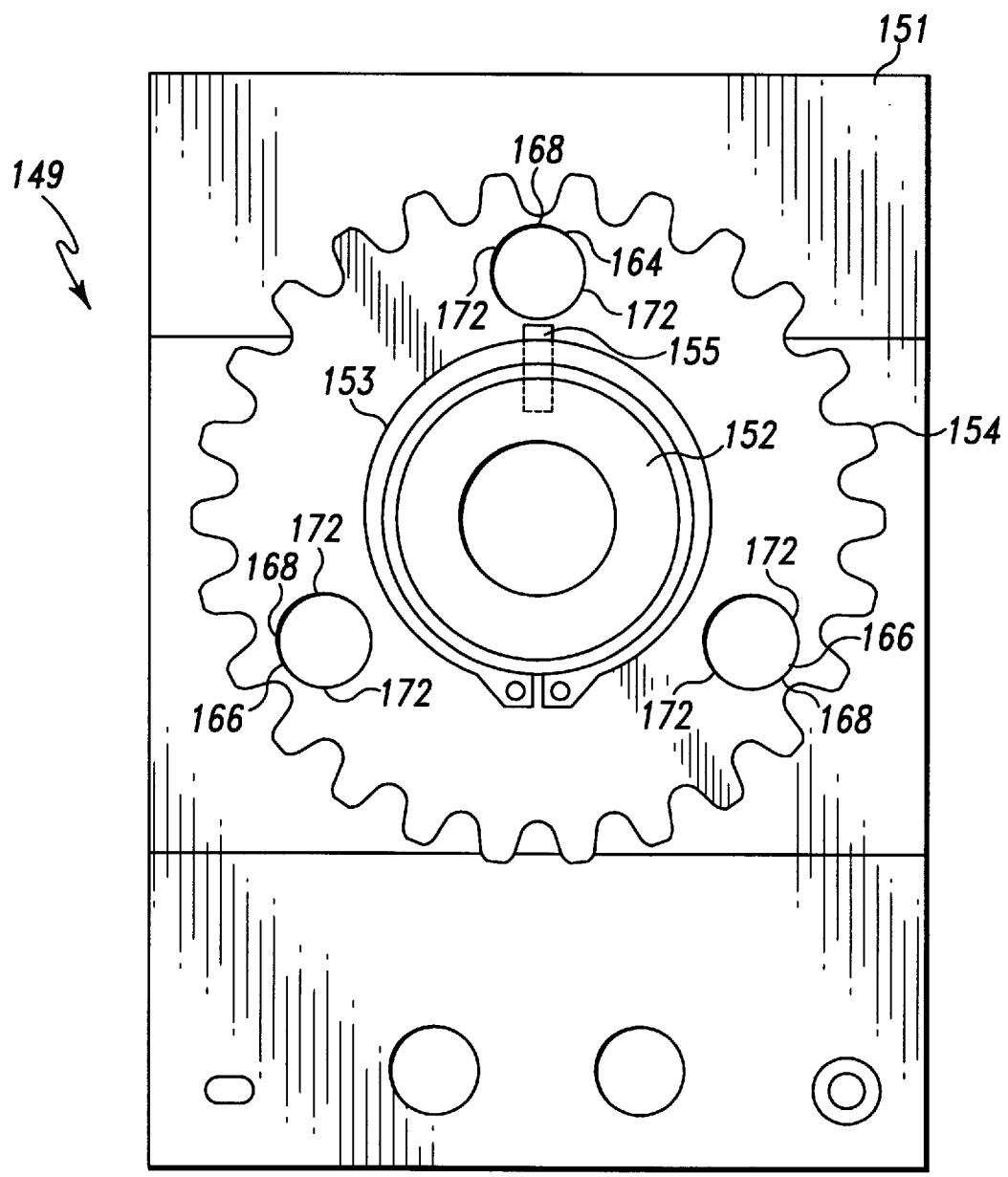
FIG. 5 is an enlarged detail bottom plan view of the mandrel assembly of a non-round container blow molding apparatus representing a second embodiment of the present invention.

In order to determine the thermal variations as a function of angular orientation of each parison produced in second heating station 103, at least one sensor 164 is provided to identify an angular orientation of each parison at a selected position in second heating station 103. Sensor 164 includes at least one marker 166 fixed to each rotatable member 150. As depicted in FIGS. 2 and 4, in the case where a blow molded container having 180 degree symmetry is to be formed by the present invention, a pair of markers 166 may be fixed to each rotatable member 150 by defining a pair of apertures 168 through each sprocket 154 and separated by 180 degrees with respect to the rotation axis of rotatable member 150.

Where blow molded containers having other than 180 degree symmetry are to be formed by the present invention, appropriate numbers and locations of markers 166 may be fixed to each rotatable member 150, for instance by defining appropriate apertures 168 through each sprocket 154. By way of example, as depicted in FIG. 5, where blow molded containers having 120 degree symmetry are to be formed, three markers 166 in the form of three apertures 168 defined through sprocket 154 at 120 degree separation may be provided. As a further example, not illustrated, where asymmetric blow molded containers such as a teardrop shape are to be formed, a single marker 166 may be fixed to each rotatable member 150.

Figure 3:
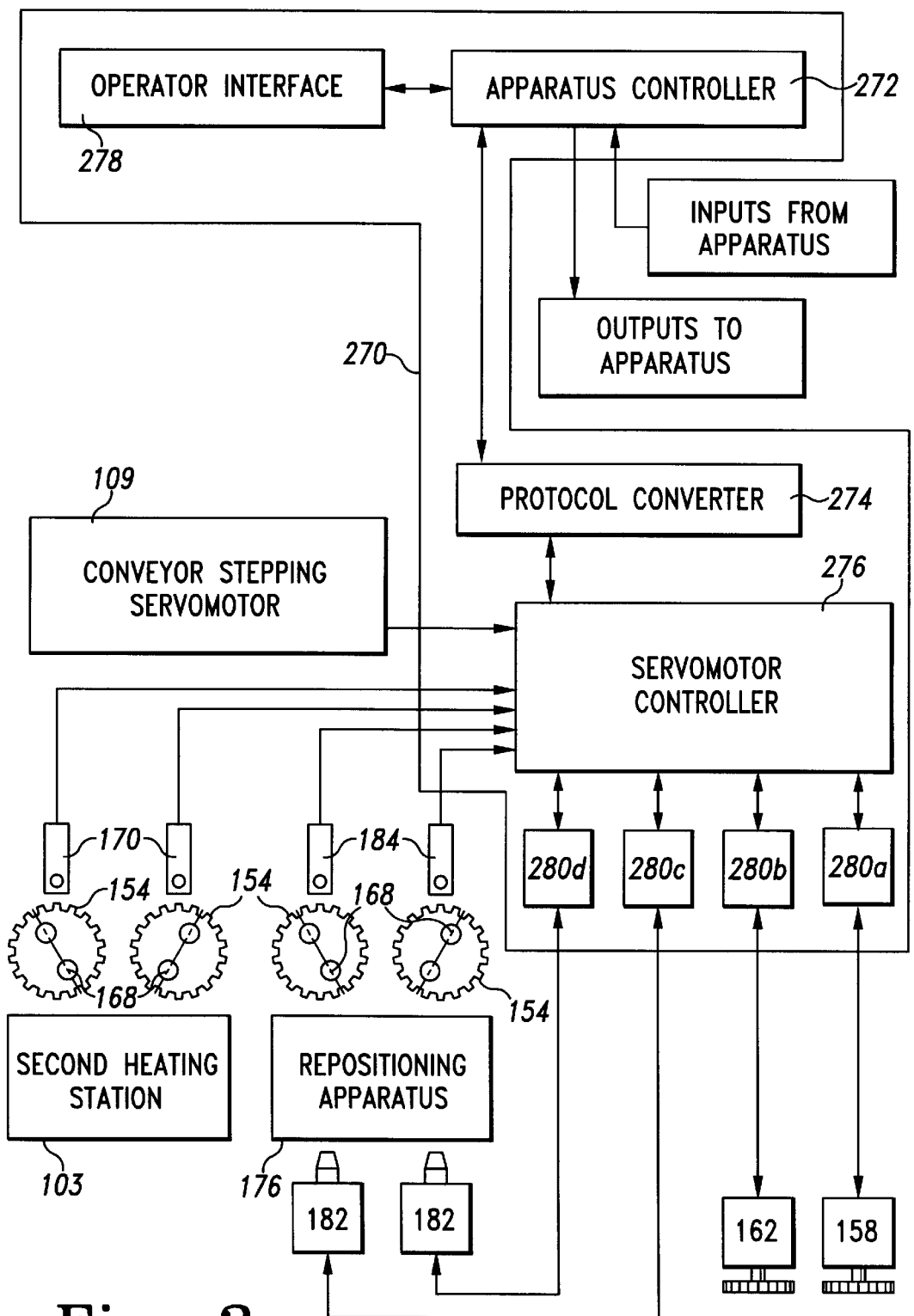
FIG. 3 is block diagram representing operation of the present invention.

Referring to FIGS. 1–3, sensor 164 includes a pair of detectors 170 fixed at end 171 of second heating station 103 to detect markers 166 on each of a pair of parison holders 108 during the non-uniform rotation. Detectors 170 independently operate to detect the angular position of markers 166 so as to define an angular orientation relation between markers 166 of each parison holder 108 and a selected point in the cycle of the non-uniform rotation. Where, as illustrated in FIGS. 4 and 5, markers 166 include apertures 168, detectors 170 may be selected to be any of a wide variety of available photoelectric sensors, such as Cutler-Hammer Diffuse Reflective Photoelectric Sensor, Comet Series, No. 13106A6517 available from Eaton, Milwaukee, Wis., and adapted to detect aperture edges 172 as sprockets 154 rotate. Each detector 170 is coupled to optic cable 173, such as Cutler Hammer No. E51KF563.

As shown in FIG. 1, blow molding station 104 is disposed proximate to second linear segment 114. The operation of blow molding station 104 will not be described in detail for the reason that the characteristics of such blow molding stations are well known in the art, such as described in U.S. Pat. No. 5,516,274.

Also as shown in FIG. 1, the present invention includes idle station 177 disposed after second heating station 103, where second chain 160 disengages from sprockets 154. At idle station 177, rotatable members 150 and parisons engaged thereon may rotate freely, whereby information concerning the angular orientation of the parisons is lost. To regain such angular orientation information and reorient the parisons, repositioning apparatus 178 is disposed between idle station 177 and blow molding station 104, for independently angularly reorienting each parison immediately prior to introduction into blow molding station 104. By such angular orientation, thermal variations in the parisons can be employed to facilitate formation of non-round containers having a substantially uniform side wall thickness within blow molding station 104.

Figure 6:
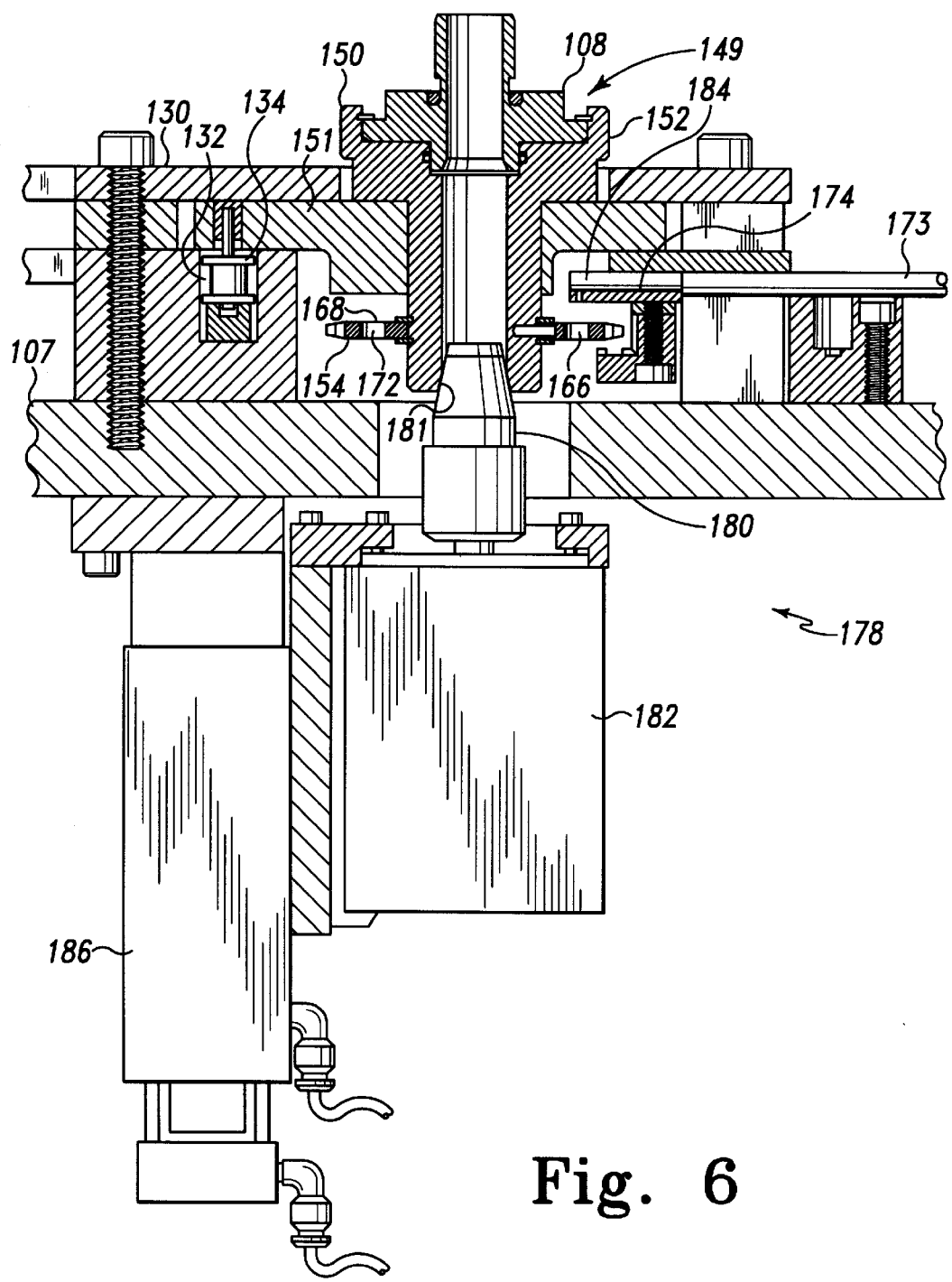
FIG. 6 is an enlarged detail partial section view taken along line 6—6 of FIG. 1.

With reference to FIG. 6, repositioning apparatus 178 includes a pair of spindles 180 positioned to engage conical ends 181 of mandrels 152 of rotatable members 150. A separately controllable spindle servomotor 182 is coupled to each spindle 180. A pickup 184 is situated adjacent to each spindle 180 for detecting the rotational position of the at least one marker 166 fixed to rotatable member 150 on each parison holder 108. Where markers 166 include apertures 168 as illustrated in FIGS. 4, 5, and 6 pickups 184 may be selected to be photoelectric sensors, such as Cutler-Hammer Diffuse Reflective Photoelectric Sensor, Comet Series, already described, coupled to optic cables 173 and adapted to detect aperture edges 172 as sprockets 154 rotate. Air pressure is provided for moving each spindle 180 into and out of engagement with a mandrel 152 by sliding action of powered slide 186. In a preferred embodiment, powered slide 186 may be selected to be any of a variety of powered slides, such as Powered Slide SEB25X.75-PBDBU7EJ6-AE available from PHD, Fort Wayne, Ind.

An electrical circuit, not shown, is provided for independently operating each spindle servomotor 182 for a time sufficient to reconstruct the angular orientation relation between each marker 166 and the selected point in the cycle of the non-uniform rate of rotation for each rotatable member 150. In this way, spindle servomotors 182 are adapted to independently reposition each parison holder 108 and hence each parison to a desired, optimum orientation immediately prior to introduction of the parisons into blow molding station 104. As a result, thermal variations in the parisons caused by non-uniform heating in second heating station 103 can be employed to facilitate formation of non-round containers having a substantially uniform side wall thickness within blow molding station 104, as next described.

As illustrated in FIG. 1, blow molding station 104 includes a pair of blow mold units 248 having non-round interior surfaces, not shown, with each blow mold unit 248 capable of blowing a parison to form a blow molded container. Each blow mold unit 248 defines an axis that corresponds with a symmetry axis defined by parisons positioned in the blow mold units 248 prior to blowing. Additionally, each non-round interior surface has rotational periodicity about the axis corresponding with the number and location of markers 166 fixed to rotatable members 150. For example, as depicted in FIG. 4, where blow molded containers having 180 degree symmetry are to be formed, two markers 166 in the form of two apertures 168 defined through sprocket 154 at 180 degree separation are provided, and the non-round interior surface of each blow mold unit 248 has rotational periodicity of 180 degrees. As a second example, as illustrated in FIG. 5, in a second embodiment of the present invention, where blow molded containers with 120 degree symmetry are to be formed, three markers 166 in the form of three apertures 168 defined through sprocket 154 at 120 degree separation are utilized, and the non-round interior surface of each blow mold unit 248 has rotational periodicity of 120 degrees.

Blow molding station 104 is adapted to simultaneously blow a pair of parisons to form non-round blow molded containers having a substantially uniform side wall thickness from rotationally symmetric parisons in coordination with each step-wise movement, where repositioning apparatus 178 has oriented those portions of each parison having relatively higher temperature to be blown into contact with regions of the interior surfaces disposed relatively closer to the axis of blow mold unit 248, and has oriented those portions of each parison having relatively lower temperatures to be blown into contact with regions of the interior surfaces disposed relatively more distant from the axis of blow mold unit 248. By orienting the parisons in this manner prior to blow molding, lower temperature portions of each parison are blown to relatively larger radial distances from the axis of blow mold unit 248, while higher temperature portions of each parison are blown to relatively smaller radial distances from the axis of blow mold unit 248, resulting in formation of non-round containers having a substantially uniform side wall thickness.

After blow molding station 104 has blown a pair of parisons into blow molded containers with each step-wise movement of parison holders 108, conveyor 106 moves the blow molded containers from blow molding station 104 to parison unloader 250. Parison unloader 250 is disposed proximate to second curved segment 115 and is capable of disgorging blow molded containers from the present invention. Parison unloader 250 includes a pair of unloader arms 252. Each unloader arm 252 is adapted to engage or grab a blow molded container by pinching movement of unloader arm jaws 254 actuated by air pressure delivered to unloader arm jaw pneumatic actuators 258 by tubing 260. After unloader arm jaws 254 pinch together to grip the blow molded containers, each unloader arm 252 rotates away from the proximate second curved segment 115 with rotation of unloader axle 262 resulting from actuation of unloader arm rotation driver 264. As a result, unloader arms 252 act to move blow molded containers away from the present invention. Thereafter, unloader arm jaw pneumatic actuators 258 cause unloader arm jaws 254 to separate, releasing blow molded containers and consequently disgorging the blow molded containers from the present invention. It is preferred that unloader arm jaws 254 simultaneously grip blow molded containers, rotate about the axis of unloader axle 262 to move the blow molded containers away from the second curved segment 115, and release blow molded containers in coordination with each step-wise movement of parison holders 108.

The present invention further includes programmable unit 270 for coupling and coordinating movements of stepping servomotor 109, parison loaders 117, blow molding station 104, first and second servomotors 158 and 162, spindle servomotors 182, and parison unloader 250. Referring to FIG. 3, programmable unit 270 includes apparatus controller 272 coupled to protocol converter 274, which is in turn coupled to servomotor controller 276. Apparatus controller 272 may also receive a variety of information from other components of the apparatus of the present invention, and provide outputs to control such components. Operator interface 278 is also coupled to apparatus controller 272.

Programmable unit 270 acts so that during each step-wise movement of parison conveyor 106, parison holders 108 step-wise advance around parison conveyor 106. Servomotor controller 276 is coupled through servo drive amplifier 280a to first servomotor 158 for prescribing rotation of the parisons being transported through first heating station 102, and to second servomotor 162 through servo drive amplifier 280b for prescribing the non-uniform rate of rotation of the parisons as the parisons are transported through second heating station 103. As used herein, electronic "gearing" refers to continuously sensing the instantaneous velocity of stepping servomotor 109 during step-wise movement, and continually adding such variable instantaneous velocity to the rate of rotation of first and second servomotors 158 and 162. Programmable unit 270 thus electronically "gears" the first servomotor 158 and the second servomotor 162 to the stepping servomotor 109. Programmable unit 270 is also coupled to each detector 170 through optic cables 173 for correlating the angular orientation of each parison at a selected position in second heating station 103 with a cycle of the non-uniform rate of rotation, and is coupled to each pickup 184 for independently detecting the rotational position of markers 166 fixed to rotatable member 150 on each parison holder 108. In addition, servomotor controller 276 is coupled to spindle servomotors 182 through servo drive amplifiers 280c, 280d for independently angularly reorienting each parison holder 108, whereby each parison is disposed at a chosen angular orientation prior to introduction into blow molding station 104.

Programmable unit 270 further acts so that during each step-wise movement of parison conveyor 106, a pair of parisons moves from second heating station 103 to idle station 177, another pair of parisons moves from idle station 177 to repositioning apparatus 178, yet another a pair of parisons moves from repositioning apparatus 178 to blow as molding station 104, and a pair of blow molded containers moves from blow molding station 104 to parison unloader 250. Further, after each step-wise movement of parison conveyor 106, a pair of parisons is loaded onto parison holders 108 at first linear segment 112, another pair of parisons is blow molded to form containers at blow molding station 104, and a pair of blow molded containers is disgorged from parison unloader 250.

Although as represented in FIGS. 1 and 2, in a preferred embodiment of the apparatus of the present invention, the number of pick arms 119, parison delivery tracks 120, detectors 170, spindles 180, spindle servomotors 182, blow mold units 248, and unloader arms 252 is selected to be two, and each step-wise movement of conveyor 106 advances parison holders 108 by a spacing corresponding to two parison holders 108, it will, of course, be understood that within the scope of the present invention, the number of pick arms 119, parison delivery tracks 120, detectors 170, spindles 180, spindle servomotors 182, blow mold units 248, and unloader arms 252 may be chosen to be greater or less than two.

The method of the present invention for blow molding a non-round container having a substantially uniform sidewall thickness from a rotationally symmetric parison includes transporting the parison through second heating station 103, and cyclically rotating the parison a prescribed non-uniform rate as the parison is transported through second heating station 103 to induce thermal variations in the parison. The step of cyclically rotating the parison may also include engaging second chain 160 extending through second heating station 103 with sprocket 154 on rotatable member 150 of parison holder 108 while parison holder 108 is in second heating station 103, and coupling second servomotor 162 to drive second chain 160 at the prescribed non-uniform rate as the parison is transported through second heating station 103.

The method further includes sensing an angular orientation of the parison at a selected position in second heating station 103, and may also include detecting a rotational position of at least one marker 166 fixed to rotatable member 150 of parison holder 108 during a cycle of the prescribed non-uniform rate of rotation and defining a relation between the rotational position of the at least one marker 166 and the cycle of the non-uniform rate of rotation.

In addition, the method includes angularly reorienting the parison after heating and immediately prior to introduction into blow molding station 104 so that the thermal variations can be employed to facilitate formation within blow molding station 104 of a non-round container having a substantially uniform side wall thickness. The step of angularly reorienting the parison may also include positioning spindle 180 to engage rotatable member 150 and operating spindle servomotor 182 coupled to spindle 180 for a time sufficient to angularly reorient the parison to reconstruct the relation between a marker 166 and a selected point in the cycle of the non-uniform rate of rotation.

The method of the present invention may further include coupling programmable unit 270 to sensor 164 for correlating the angular orientation of the parison at the selected position in second heating station 103 with a cycle of the non-uniform rate of rotation, coupling programmable unit 270 to pickup 184 for detecting the rotational position of the at least one marker 166, and coupling programmable unit 270 to spindle servomotor 182 for angularly reorienting parison holder 108, whereby the parison is disposed at a chosen angular orientation prior to introduction into blow molding station 104.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. Apparatus for blow molding a non-round container having a substantially uniform side wall thickness from a rotationally symmetric parison, the apparatus comprising:
   a blow molding station including at least one blow mold, a heating station coupled to the molding station including a source of heat, and a transportation system extending through the heating station and the blow molding station for transporting parisons through the heating station and into the blow molding station, the transportation system including:
   a rotation driver for cyclically rotating the parisons at a prescribed non-uniform rate as the parisons are transported through the heating station to induce thermal variations in the parisons,
   at least one sensor for identifying an angular orientation of each parison at a selected position in the heating station, and
   repositioning apparatus for angularly reorienting each parison immediately prior to introduction into the blow molding station so that the thermal variations can be employed to facilitate formation of non-round containers having a substantially uniform side wall thickness within the blow molding station.

2. The apparatus of claim 1 wherein the rotation driver comprises a parison holder for each parison including a rotatable member having a sprocket, a chain extending through the heating station and engaging the sprocket on each parison holder while the parison holder is in the heating station, and a servomotor engaging the chain to drive the chain at the prescribed non-uniform rate as the parisons are transported through the heating station.

3. The apparatus of claim 2 further comprising a programmable unit having an output coupled to the servomotor engaging the chain for prescribing the non-uniform rate of rotation of the parisons as the parisons are transported through the heating station.

4. The apparatus of claim 2 wherein the at least one sensor comprises at least one marker fixed to the rotatable member on each parison holder, and at least one detector fixed in the heating station to detect a rotational position of the at least one marker during a cycle of the prescribed non-uniform rate of rotation to define a relation between the rotational position of the at least one marker and the cycle of the non-uniform rate of rotation.

5. The apparatus of claim 4 further comprising a programmable unit prescribing the non-uniform rate of rotation of the parisons as the parisons are transported through the heating station and having an input coupled to the at least one detector fixed in the heating station for correlating the rotational position of the at least one marker fixed to the rotatable member on each parison holder with the cycle of the non-uniform rate of rotation.

6. The apparatus of claim 4 wherein the repositioning apparatus comprises a spindle positioned to engage one at a time the rotatable member on at least some of the parison holders, a spindle servomotor coupled to the spindle, and a circuit for operating the spindle servomotor for a time sufficient to angularly reorient each parison to reconstruct the relation between the at least one marker and a selected point in the cycle of the non-uniform rate of rotation.

7. The apparatus of claim 6 further comprising a pickup situated adjacent to the spindle for detecting the rotational position of the at least one marker fixed to the rotatable member on each parison holder and a programmable unit having an input coupled to the pickup and an output coupled to the spindle servomotor for defining an optimum angular orientation of the parison prior to introduction into the blow molding station.

8. The apparatus of claim 6, further comprising a programmable unit coupled to the rotation driver for prescribing the non-uniform rate of rotation of the parisons as the parisons are transported through the heating station, coupled to the at least one sensor for correlating the angular orientation of each parison at the selected position in the heating station with a cycle of the non-uniform rate of rotation, coupled to a pickup for detecting the rotational position of the at least one marker fixed to the rotatable member on each parison holder, and coupled to the spindle servomotor for angularly reorienting each parison holder whereby each parison is disposed at a chosen angular orientation prior to introduction into the blow molding station.

9. The apparatus of claim 1 further comprising a programmable unit coupled to the rotation driver for prescribing the non-uniform rate of rotation of the parisons as the parisons are transported through the heating station.

10. The apparatus of claim 9 wherein the programmable unit includes at least one input coupled to said at least one sensor to permit correlation between the angular orientation of each parison at a selected position in the heating station and a cycle of the non-uniform rate of rotation.

11. Apparatus for blow molding a non-round container having a substantially uniform side wall thickness from a rotationally symmetric parison, the apparatus comprising:

a blow molding station including a number of blow molds having non-round interior surfaces, the number being an integer greater than zero, a heating station coupled to the molding station including a source of heat, and a transportation system extending through the heating station and the blow molding station for transporting parisons through the heating station and into the blow molding station in a step-wise fashion, the transportation system including:

a series of parison holders, coupling elements coupling the parison holders together in an endless loop, and a stepping motor for transporting the series of parison holders in a step-wise fashion, each step advancing the entire series by a number of parison holders equal to the number of blow molds, a rotatable member carried by each parison holder having a parison engaging mandrel and a sprocket, a chain extending through the heating station and engaging the sprocket on each parison holder while the parison holder is in the heating station, and a servomotor engaging the chain to drive the chain at a prescribed cyclic non-uniform rate as the parisons are transported through the heating station to effect a predetermined non-uniform rotation and heating of each parison resulting in controlled thermal variations, at least one marker fixed to the rotatable member on each parison holder, and a number of detectors equal to the number of blow molds fixed at a selected position in the heating station to detect the at least one marker during a cycle of the non-uniform rate of rotation to define an angular orientation relation between the marker and a selected point in the cycle of the non-uniform rate of rotation, and a number of spindles equal to the number of blow molds positioned to engage the rotatable members on said number of the parison holders, a spindle servomotor coupled to each spindle, and a circuit for operating each spindle servomotor for a time sufficient to reconstruct the angular orientation relation between the marker and the selected point in the cycle of the non-uniform rate of rotation for each rotatable member and to reposition each parison to a desired orientation immediately prior to introduction into the blow molding station so that the thermal variations can be employed to facilitate formation of non-round containers having a substantially uniform side wall thickness within the blow molding station.

12. The apparatus of claim 11, further comprising a programmable unit coupled to the servomotor for prescribing the non-uniform rate of rotation of the parisons as the parisons are transported through the heating station, coupled to each detector for correlating the angular orientation of each parison at the selected position in the heating station with a cycle of the non-uniform rate of rotation, coupled to a pickup for detecting the rotational position of the at least one marker fixed to the rotatable member on each parison holder, and coupled to each spindle servomotor for angularly reorienting each parison holder whereby each parison is disposed at a chosen angular orientation prior to introduction into the blow molding station.

* * * * *